US011918021B2

(12) United States Patent
Goh

(10) Patent No.: US 11,918,021 B2
(45) Date of Patent: Mar. 5, 2024

(54) GLYCEMIC REDUCING COMPOSITION

(71) Applicant: ALCHEMY FOODTECH PTE. LTD., Singapore (SG)

(72) Inventor: Zhi Min Verleen Goh, Singapore (SG)

(73) Assignee: ALCHEMY FOODTECH PTE. LTD., Singapore (SG)

( * ) Notice: Subject to any disclaimer, the term of this patent is extended or adjusted under 35 U.S.C. 154(b) by 206 days.

(21) Appl. No.: 16/077,207

(22) PCT Filed: Feb. 7, 2017

(86) PCT No.: PCT/SG2017/000003
§ 371 (c)(1),
(2) Date: Aug. 10, 2018

(87) PCT Pub. No.: WO2017/142477
PCT Pub. Date: Aug. 24, 2017

(65) Prior Publication Data
US 2019/0029307 A1    Jan. 31, 2019

(30) Foreign Application Priority Data
Feb. 15, 2016 (GB) ...................................... 1602626

(51) Int. Cl.
*A23L 33/21* (2016.01)
*A23L 29/212* (2016.01)
(Continued)

(52) U.S. Cl.
CPC ............ *A23L 33/21* (2016.08); *A23L 29/212* (2016.08); *A23L 33/10* (2016.08); *A23L 33/105* (2016.08);
(Continued)

(58) Field of Classification Search
CPC ....................................................... A23L 33/21
See application file for complete search history.

(56) References Cited

U.S. PATENT DOCUMENTS

2004/0191377 A1*  9/2004  Malleshi ............... A23L 33/155
                                                      426/466
2005/0244568 A1* 11/2005  Gokhan ................. A23L 33/22
                                                      426/658
(Continued)

FOREIGN PATENT DOCUMENTS

CN        101116505        2/2008
CN        101940276        1/2011
(Continued)

OTHER PUBLICATIONS

Behall et al., "Consumption of Both Resistant Starch and B-Glucan Improves Postprandial Plasma Glucose and Insulin in Women", Diabetes Care, vol. 29, No. 5, May 2006, pp. 976-981. (Year: 2006).*
(Continued)

*Primary Examiner* — Elizabeth Gwartney
(74) *Attorney, Agent, or Firm* — Norton Rose Fulbright US LLP

(57) ABSTRACT

The invention relates to an advanced food material in the form of a composition for lowering the glycemic index of a foodstuff and a composite comprising said composition and said foodstuff particularly, but not exclusively, wherein said foodstuff has a glycaemic index which is favourably lowered by the addition of said material. Said composition comprises or consists of insoluble resistant starch in an amount of 40-80% by weight of the composition, soluble fibre, and at least one carbohydrate enzyme inhibitor.

15 Claims, 2 Drawing Sheets

Figure 1:
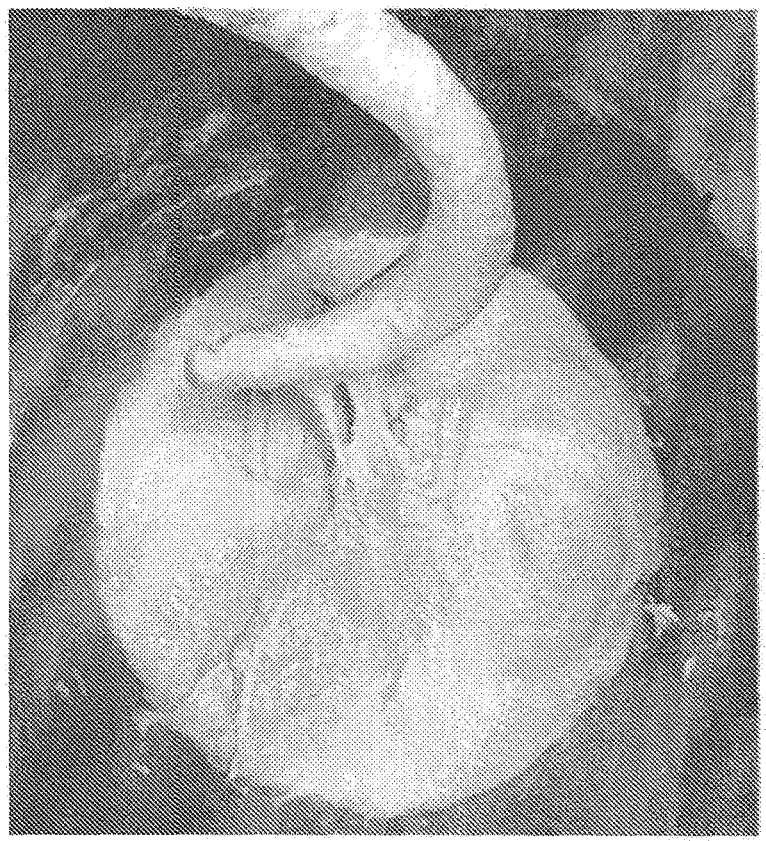

(51) Int. Cl.
  *A23L 33/10*   (2016.01)
  *A23L 33/105*  (2016.01)
  *A23L 33/185*  (2016.01)
  *A23L 33/19*   (2016.01)
  *A23P 10/40*   (2016.01)

(52) U.S. Cl.
  CPC ............ *A23L 33/185* (2016.08); *A23L 33/19* (2016.08); *A23P 10/40* (2016.08); *A23V 2002/00* (2013.01)

(56) References Cited

U.S. PATENT DOCUMENTS

| | | | |
|---|---|---|---|
| 2007/0020313 | A1 | 1/2007 | Palat et al. |
| 2009/0252796 | A1* | 10/2009 | Mazed ............... A61K 36/45 424/484 |
| 2010/0196532 | A1* | 8/2010 | Aymard ............ A23C 9/137 426/2 |
| 2012/0252887 | A1 | 10/2012 | Ahrens et al. |
| 2014/0099421 | A1* | 4/2014 | Zhao ................. A21D 2/36 426/549 |
| 2017/0042969 | A1* | 2/2017 | Friedrich ........... A61K 38/06 |

FOREIGN PATENT DOCUMENTS

| | | |
|---|---|---|
| CN | 102038126 | 5/2011 |
| CN | 102415572 | 4/2012 |
| DE | 10244359 | 4/2004 |
| JP | 04-063561 | 2/1992 |
| JP | 04-063563 | 2/1992 |
| JP | 2002306094 | 10/2002 |
| JP | 2004024109 | 1/2004 |
| JP | 2007049952 | 3/2007 |
| JP | 2012213394 | 11/2012 |
| JP | 2014505728 | 3/2014 |
| JP | 201468620 | 4/2014 |
| JP | 2014521741 | 8/2014 |
| JP | 2014529596 | 11/2014 |
| JP | 5710057 | 4/2015 |
| JP | 2015514411 | 5/2015 |
| JP | 2016002000 | 1/2016 |
| RU | 2525429 | 8/2014 |
| WO | WO 2005/046347 | 5/2005 |
| WO | WO 2005/117608 | 12/2005 |
| WO | WO 2009/157767 | 12/2009 |
| WO | WO 2012/085266 | 6/2012 |
| WO | WO 2012/112421 | 8/2012 |
| WO | WO 2013/025201 | 2/2013 |
| WO | WO 2013/025202 | 2/2013 |

OTHER PUBLICATIONS

Jayaraj et al., Amylase inhibitors and their biomedical applications, Starch, 65 (2013), pp. 535-542. (Year: 2013).*

Inglett et al., "Sensory and Nutritional Evaluations of Oatrim"—Research CFW, vol. 39, No. 10, Oct. 1994, pp. 755-759. (Year: 1994).*

Ingredion, Technical Specification HI-MAIZE® 260—Product data sheet, 2017, p. 1-3. (Year: 2017).*

Baur et al., "Resveratrol improves health and survival of mice on a high-calorie diet," *Nature*, 2006, 144(7117):337-342.

International Search Report and Written Opinion issued in International Patent Application No. PCT/SG2017/000003, dated May 3, 2017.

Sales et al., "(α-Amylase inhibitors: a review of raw material and isolated compounds from plant source." *J. Pharm Pharmaceut Sci.*, 2012, 15(1):141-183

Written Opinion of the Intellectual Property Office of Singapore issued in corresponding Application No. 11201806769W dated Jan. 2, 2018.

Classification of dietary fibre. Desiree Nedra Karunaratne. The Complex World of Polysaccharides, pp. 458-460, 2012.

Glycemic impact of dietary fibre. Schulze et al. "Glycemic index, glycemic load, and dietary fiber intake and incidence of type 2 diabetes in younger and middle-aged women." The American Journal of Clinical Nutrition, 80(2): 348-356, 2004.

Glycemic index for 60+ foods. Measuring carbohydrate effects can help glucose management. Published February 2015.

Office Action issued in Corresponding Japanese Application No. 2018-541158, dated Jan. 6, 2021 (English Translation provided).

Shin et al., "Hot-Water Solubilities and Water Sorptions of Resistant Starches at 25° C." *Cereal Chem*, 2003, 80(5), 564-566.

"Physiological function of b-glucan in barley Seiichiro Aoe." *Journal for the Integrated Study of Dietary Habits* 2015, 26(1), p. 3-6 (English Translation).

Aoe, Seiichiro. Physiological Function of ß-glucan in barley. 2015. Department of Food Science, Faculty of Home Economics, Otsuma Women's University.

*Barley Betafiber Handling/Processing*. Barley Betafiber Technical Evaluation Report, 2012.

*Fibersol®-2 non-GMO (Product Code 1000901)*. Fibersol®-2 Manufacturer: ADM Bio Science & Technology (Tianjin) Co., Ltd., 2019.

Heber et al., "Cholesterol-lowering effects of a proprietary Chinese red-yeast-rice dietary supplement1—4" *Am J Clin Nutr* 1999;69:231-6.

Kadnikova et al., "Chemical Composition and Nutritional Value ofthe Mushroom Auricularia auricula-judae" *Journal of Food and Nutrition Research* 2015, 3(8), 478-482.

*NUTRIOSE® FM06*. Roquette Product Specifications Sheet, 2019.

Office Action issued in Corresponding Chinese Application No. 201780007775.3, dated Sep. 16, 2021 (English translation provided).

Office Action issued in Corresponding Japanese Application No. 2018-541158, dated Oct. 4, 2021 (English translation provided).

Saha et al., "Hydrocolloids as thickening and gelling agents in food: a critical review" *J Food Sci Technol* 2010, 47(6), 587-597.

Song, Jianhua. *Healthy Detoxification*. China Drama Publishing House, 2007, pp. 261-263 (English Machine Translation).

Wu, Dianxing. *Research and Utilization of Functional Rice*. China Metrology Publishing House, 2006, pp. 140-141 (English Machine Translation).

Xu, Xianling et al. *Health Care Guide*. China Drama Publishing House, 2005, pp. 60-61 (English Machine Translation).

Kumar et al., "Low glycemic index Low glycemic index modified starches in wheat based food processing: A review" Trends in Food Science & Technology 2014, 35, 32-41.

Common knowledge evidence 4: "Research and Utilization of Functional Rice", Dianxing, WU, pp. 140-141, China Metrology Publishing House, published on Aug. 31, 2006 (English Machine translation provided).

Office Action issued in Corresponding Chinese Application No. 201780007775.3, dated Mar. 16, 2022 (English Translation provided).

Decision of Final Rejection is issued in corresponding Chinese Application No. 201780007775.3, dated Jul. 5, 2022 (English Translation provided).

Gao, Ke. *How to Eat to Live a Long and Healthy Life*. World Publishing Shanghai Corporation, 2005, p. 79 (English Translation provided).

Li, Yanling. *198 Tips to Get Rid of Misunderstandings about Diabetes*. Tianjin Science & Technology Translation & Publishing Corp., 2008, pp. 49-50 (English Translation provided).

R.A. Samaan, *Dietary Fiber for the Prevention of Cardiovascular Disease: Fiber's Interaction between Gut Microflora, Sugar Metabolism, Weight Control and Cardiovascular Health*, Academic Press, 2017, p. 37.

\* cited by examiner

| Sample | 100% Insoluble Resistant Starch | 100% Soluble Fibre | 90% Insoluble Resistant Starch) + 10% Soluble Fibre | 80% Insoluble Resistant Starch) + 20% Soluble Fibre |
|---|---|---|---|---|
| Water (ml) | 25.75 | 25.75 | 25.75 | 25.75 |
| Insoluble resistant starch (g) | 50 | 0 | 45 | 40 |
| Soluble fibre (g) | 0 | 50 | 5 | 10 |
| Observations | Not able to form a dough | Not able to form a dough | Not able to form a dough | Able to form a dough |
| Picture | 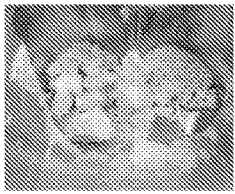 | 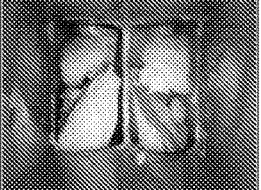 | 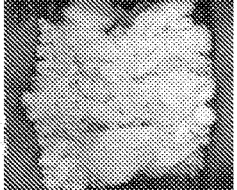 | 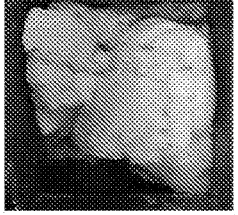 |
| Water absorption | 50.50% | no results as the material was stuck to the blades | 54.50% | 57% |

FIG. 3

GLYCEMIC REDUCING COMPOSITION

CROSS-REFERENCE TO RELATED APPLICATIONS

This application is a national phase application under 35 U.S.C. § 371 of International Application No. PCT/SG2017/000003, filed Feb. 7, 2017, which claims priority to and the benefit of United Kingdom Application No. 1602626.2, filed Feb. 15, 2016. The contents of the referenced patent applications are incorporated into the present application by reference.

FIELD OF THE INVENTION

The invention relates to an advanced food material in the form of a composition for lowering the glycemic index of a foodstuff and a composite comprising said composition and said foodstuff particularly, but not exclusively, wherein said foodstuff has a glycaemic index which is favourably lowered by the addition of said material.

BACKGROUND OF THE INVENTION

There are a number of pathological conditions that result in hyperglycaemia; the most well-known being diabetes mellitus. Diabetes is essentially due to either the pancreas not producing enough insulin or the cells of the body not responding properly to the insulin produced. Diabetes mellitus can be of type 1 or type 2:

Type 1 diabetes is an autoimmune disease resulting in destruction of the pancreatic β cells which means the subject is unable to produce sufficient levels of insulin;

Type 2 diabetes is a more complicated condition and can result from a number of associated ailments but commonly involves resistance to the metabolic actions of insulin. For example, type 2 diabetes is associated with age, obesity and a sedentary life style all of which result in insulin resistance.

Without sufficient insulin in the bloodstream, after a carbohydrate rich meal, glucose in the bloodstream is unable to move out and into the cells. The blood glucose levels increases, and this is known as hyperglycemia. All forms of diabetes increase the risk of long-term complications. These typically develop after many years (10-20), but may be the first symptom in those who have otherwise not received a diagnosis before that time. If left untreated, hyperglycemia can cause long-term complications such as cardiovascular disease, neuropathy, diabetic nephropathy, diabetic retinopathy which can potentially lead to blindness, and serious limb infections which can potentially lead to amputation.

Globally, there are 387 million diabetics with Type 2 diabetes being responsible for up to 90% of these cases. Diabetes at least doubles a person's risk of death and by 2035 it is expected that the number of people with diabetes is expected to rise to 592 million.

Diabetes mellitus is a chronic disease, for which there is no known cure except in very specific situations. Clinical treatment goals for type 2 diabetes are primarily focused on lowering blood glucose levels to forestall diabetes related complications, and can be managed with or without administration of insulin.

One recommendation for diabetic patients to maintain their blood glucose levels is to follow a specific dietary plan, however, there is much disagreement about what represents an optimum diabetic diet. Since carbohydrate is the macronutrient which raises blood glucose levels most significantly, the greatest debate is regarding how low in carbohydrates the diet should be. This is because although lowering carbohydrate intake will lead to reduced blood glucose levels, carbohydrates are traditionally considered the main energy source in most modern diets, and a low-carbohydrate diet is likely to contain increased amounts of calories from fat and saturated fat. The most agreed upon recommendation is for the diet to be low in sugar and refined carbohydrates, while relatively high in dietary fiber, especially soluble fiber. Likewise, people with diabetes may be encouraged to reduce the intake of carbohydrates that have a high glycemic index (GI) and therefore follow a low GI diet.

A low-GI diet is one that selects foods on the basis of minimal alteration of circulating glucose levels. Glycemic index (GI) and glycemic load (GL) are measures of the effect on blood glucose level after a food containing carbohydrates is consumed. A diet based on foods with a low glycemic response has been associated with diabetes management, improved blood lipids (cholesterol), and reduced risk of heart disease.

Unfortunately a low GI diet is not easy to achieve, as many meals comprise refined carbohydrates, such as rice, noodles and white bread. For example, rice is the staple food of more than half of the world's population—more than 3.5 billion people depend on rice for more than 20% of their daily calories. In 2009, rice provided 19% of global human per capita energy and 13% of per capita protein. Asia accounts for 90% of global rice consumption, and the total rice demand there continues to rise.

As Asia becomes more affluent, the consumption of refined rice and rice products that are high in simple carbohydrates goes up. Despite the push for more wholegrain and unrefined rice and rice products in the developed Asian cities (where most diabetics in Asia are found), the preference for refined rice and refined rice products makes it challenging for diabetics to control their diet, causing hyperglycemia.

We disclose herein a novel advanced food material in the form of a composition for lowering the glycemic index of a foodstuff, especially those of refined carbohydrates, without adversely affecting the taste, texture, appearance, cooking method and shelf life of same. Indeed, it has surprisingly been found that the material disclosed herein comprises the correct balance and amounts of components that have been found to reduce glycemic index to such a degree that a typically high GI food is rendered a low GI food upon addition of said material. The material therefore has utility in its addition to food to reduce the GI levels of same, and also in the preparation and manufacture of low GI food stuffs, and as part of a low GI diet in the management of weight loss or diabetes.

STATEMENTS OF INVENTION

According to a first aspect of the invention there is a provided an advanced food material in the form of a composition for lowering the glycemic index of a foodstuff comprising or consisting of insoluble resistant starch, soluble fibre, and at least one carbohydrate enzyme inhibitor(s) wherein said insoluble resistant starch is present in an amount selected from the range 40-80% by weight of the composition.

The term glycemic index is one well known by those skilled in the art and refers to a number associated with a particular type of food following consumption that indicates the food's effect on a person's blood glucose level. The glycemic index is usually applied in the context of the quantity of the food and the amount of carbohydrate in the food that is actually consumed. A related measure, the glycemic load (GL), factors this in by multiplying the glycemic index of the food in question by the carbohydrate content of the actual serving.

The glycemic index of a food is defined as the incremental area under the two-hour blood glucose response curve (AUC) following a 12-hour fast and ingestion of a food with a certain quantity of available carbohydrate (usually 50 g). The AUC of the test food is divided by the AUC of the standard (either glucose or white bread, giving two different definitions) and multiplied by 100. The average GI value is calculated from data collected in 10 human subjects. Both the standard and test food must contain an equal amount of available carbohydrate. The result gives a relative ranking for each tested food. A value of 100 represents the standard, an equivalent amount of pure glucose. GI values can be interpreted as percentages on an absolute scale relative to glucose and are commonly interpreted as follows:

i) Low GI=55% or less;
ii) Medium GI=56-69%;
iii) High GI=70% and above.

As is known to those skilled in the art, a low-GI food will release glucose more slowly and steadily, which leads to more suitable postprandial (after meal) blood glucose readings. A high-GI food causes a more rapid rise in blood glucose levels.

Reference herein to resistant starch refers to any starch, or starch products, that are not digested and absorbed in the stomach or small intestine and pass on to the large intestine, where it is digested by bacteria to form short chain fatty acids such as butyrate. Studies have shown that resistant starch is effective at lowering blood sugar levels after meals, and contributes to a second meal effect. Some studies have also shown that resistant starch increases insulin sensitivity.

In a preferred embodiment of the invention, said resistant starch is present in an amount selected from the group comprising or consisting of: 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79% and 80%, including every 0.1% integer there between.

Reference herein to insoluble resistant starch refers to the afore starch that is essentially incompletely soluble (i.e. insoluble or essentially insoluble) in water or in aqueous solution.

As disclosed herein, the composition according to the present invention is characterized as comprising insoluble resistant starch having water/aqueous insolubility at room temperature and also after being cooked. This advantageously permits formation of the composition into solid foods that require a dough formation, such as but not limited to bread, buns, noodles, pasta and for products to be extruded into different shapes using an extruder (such as, for example, rice-shape like grains).

As will be appreciated by those skilled in the art, insoluble resistant starch occurs naturally in foods but can also added to foods by the addition of isolated or manufactured types of insoluble resistant starch. In a preferred embodiment of the invention, said insoluble resistant starch is derived from a natural source or is artificially manufactured. More preferably, said insoluble resistant starch is derived from a natural source selected from the group comprising: grains, seeds, legumes, corn, rice, oat, barley, nuts, psyllium, tapioca, potatoes, beans, fruit and plantain, or the like.

As is further known to those skilled in the art, insoluble resistant starch is typically categorized into four types:

i) RS1—physically inaccessible or indigestible insoluble resistant starch, such as that found in seeds or legumes and unprocessed whole grains;
ii) RS2—insoluble starch inaccessible to enzymes due to starch conformation, as in high amylose corn starch;
iii) RS3—insoluble resistant starch that is formed when starch-containing foods are cooked and cooled, such as pasta, it arises due to retrogradation, wherein collective processes of dissolved starch becoming less soluble after being heated and dissolved in water and then cooled; or
iv) RS4—insoluble starch that have been chemically modified to resist digestion.

In a preferred embodiment of the invention, said insoluble resistant starch is a subtype selected from the group comprising: RS1, RS2, RS3 and RS4. More preferably still, said insoluble resistant starch is the subtype RS2 or RS3 or, less preferably, RS4.

Reference herein to soluble fibre refers to any form of fibre which is digestible within the body and which typically forms a viscous gel on contact with water. In this form, it is believed that this gel can trap certain food components and make them less available for absorption. In a preferred embodiment of the invention, said soluble fibre is present in an amount selected from the range 1-20% by weight of the composition.

More preferably still, said soluble fibre is present in an amount selected from the group comprising or consisting of: 1%, 2%, 3%, 4%, 5%, 6%, 7%, 8%, 9%, 10%, 11%, 12%, 13%, 14%, 15%, 16%, 17%, 18%, 19% and 20%, including every 0.1% integer there between.

As is known to those skilled in the art, soluble fibre can be found in many natural food sources. Accordingly, in yet a further preferred embodiment said soluble fibre is derived from a natural source selected from the group comprising: chicory root, grains, seeds, corn, rice, oat, barley, nuts, psyllium, tapioca, beans, fruit, or the like.

The purpose of adding the soluble fibre, in addition to its nutritional function of slowing down GI absorption, is to increase the composition's ability to hold water. This feature provides a composition that forms a dough and so can be moulded and shaped into desired food particles.

Reference herein to a carbohydrate enzyme inhibitor refers to any agent that reduces or prevents the activity of an enzyme that is involved in carbohydrate digestion such as but not limited to starch enzyme inhibitors selected from the group comprising: amylase inhibitor, sucrose inhibitor, maltase inhibitor, and glucosidase inhibitor, or the like.

In a preferred embodiment of the invention, said enzyme inhibitor is present in an amount selected from the range 0.1-10% by weight of the composition. More preferably, said enzyme inhibitor is present in an amount selected from the group comprising or consisting of: 1%, 2%, 3%, 4%, 5%, 6%, 7%, 8%, 9% and 10%, including every 0.1% integer there between.

In yet a further preferred embodiment of the invention, said composition further comprises protein wherein said protein is present in an amount selected from the range 0.1-10% by weight of the composition. More preferably still, said protein is present in an amount selected from the group comprising or consisting of: 1%, 2%, 3%, 4%, 5%, 6%, 7%, 8%, 9% and 10%, including every 0.1% integer there between.

As will be appreciated by those skilled in the art, said protein may be derived from numerous sources such as, but not limited to, natural sources selected from the group comprising or consisting of: soy, wheat, pea, rice, and whey, or the like.

In yet a further preferred embodiment still, said composition further comprises at least one hydrocolloid wherein said hydrocolloid is present in an amount selected from the range 0.1-10% by weight of the composition. More preferably, said hydrocolloid is present in an amount selected from the group comprising or consisting of: 1%, 2%, 3%, 4%, 5%, 6%, 7%, 8%, 9% and 10%, including every 0.1% integer there between.

Reference herein to hydrocolloid refers to a substance which forms a gel in the presence of water. Without wishing to be bound by theory, it is thought that the presence of a hydrocolloid increases the viscosity of food and thereby delays the rate of digestion of same. Hydrocolloids are well known to those skilled in the art and include, but is not limited to, xanthan gum, locust bean gum, agar, alginate, carrageenan, and guar gum.

In a further preferred embodiment of the invention, the advanced food material ideally comprises a composition wherein said insoluble resistant starch is present in amount of about 50% by weight, said soluble fibre is present in amount of about 10% by weight, said enzyme Inhibitor is present in amount of about 1%, said protein is present in amount of about 2% by weight and said hydrocolloid is present in amount of about 0.5% by weight. More ideally still, said advanced food material further comprises water to provide the remaining constituent.

In an alternative further preferred embodiment of the invention, the advanced food material ideally comprises a composition wherein said insoluble resistant starch is present in amount of about 70% by weight, said soluble fibre is present in amount of about 15% by weight, said enzyme Inhibitor is present in amount of about 0.5%, said protein is present in amount of about 2% by weight and said hydrocolloid is present in amount of about 0.5% by weight. More ideally still, said advanced food material further comprises water to provide the remaining constituent.

In yet a further preferred embodiment of the invention, said composition further comprises at least one fortifying agent selected from the group comprising or consisting of: vitamins, minerals, fatty acids, lipids micronutrients, and co-enzymes, or the like. As will be appreciated by those skilled in the art, food fortification or enrichment is the process of adding micronutrients (essential trace elements and vitamins) to food to improve its nutritional value. Such examples of fortifying agents include, but is not limited to, vitamins, minerals, fatty acids, lipids micronutrients, and co-enzymes. However, any number of micronutrients can be added to the composition and are well known to those skilled in the art.

In even yet a further preferred embodiment of the invention, said composition further comprises at least one stabilizer.

Reference herein to stabilizer refers to any additive, typically to foodstuffs, which helps to preserve its structure. Such additives are commonly used in the field of food preparation and known to those skilled in the art.

In yet a further preferred embodiment, said composition is provided in the form of a powder.

Yet more preferably, said advanced food material is formed into a food particle selected from the group comprising: a grain, noodle, ribbon, layer, chunk, shell, flake, thread and granule.

In yet a further preferred embodiment, said advanced food material is provided as a composite with at least one other foodstuff wherein said foodstuff has a glycemic index which is lowered by the addition of said advanced food material. More preferably, the addition of said advanced food material to said composite is in a specific effective amount that brings said glycemic index of said foodstuff and/or said composite with in a range that is beneficial for a consumer.

As disclosed herein, the components of the composition are such that they have been found to lower the glycemic index of food in order to delay digestion and avoid blood glucose spikes. In this regard, preferably said GI is lowered to a level of 55 or less thereby representing what is generally acknowledged by those skilled in the art as low GI food. Thus the effective amount of said material in said composite is an amount that lowers the GI to a selected level, e.g. of 55 or less.

It has been found that the disclosed material comprises the correct balance and amounts of components such that it effectively reduces the glycemic index of a foodstuff, and advantageously increases the fibre content, but importantly does not compromise the taste or texture of the foodstuff to which it is applied or from which it is manufactured.

Throughout the description and claims of this specification, the words "comprise" and "contain" and variations of the words, for example "comprising" and "comprises", mean "including but not limited to" and do not exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All references, including any patent or patent application, cited in this specification are hereby incorporated by reference. No admission is made that any reference constitutes prior art. Further, no admission is made that any of the prior art constitutes part of the common general knowledge in the art.

Preferred features of each aspect of the invention may be as described in connection with any of the other aspects.

Other features of the present invention will become apparent from the following examples. Generally speaking, the invention extends to any novel one, or any novel combination, of the features disclosed in this specification (including the accompanying claims and drawings). Thus, features, integers, characteristics, compounds or chemical moieties described in conjunction with a particular aspect, embodiment or example of the invention are to be understood to be applicable to any other aspect, embodiment or example described herein, unless incompatible therewith.

Moreover, unless stated otherwise, any feature disclosed herein may be replaced by an alternative feature serving the same or a similar purpose.

The Invention will now be described by way of example only with reference to the Figures and Examples below.

FIG. 1. Composition comprising bread 'dough' of 10% flour substituted with 100% starch i.e. inulin. However, with this mixture a dough could not be formed.

Figure 2:
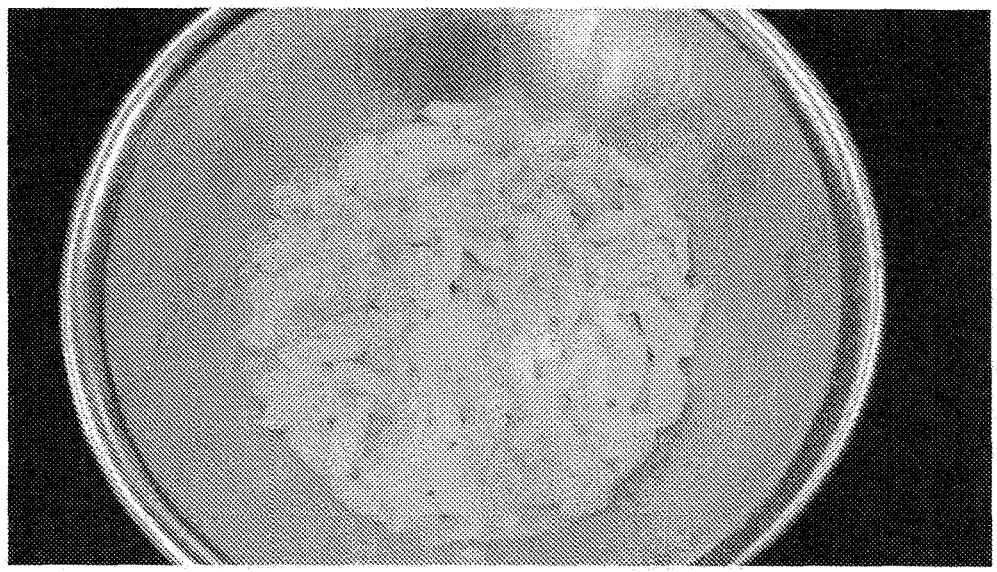

FIG. 2. Composition comprising insoluble resistant starch (70% by weight), soluble fibre (15% by weight), enzyme Inhibitor (0.5% by weight), protein (2% by weight) and hydrocolloid (0.5% by weight) extruded into a rice-shape. Following cooking in water, the food material retains its grain-shape after cooking and does not dissolve fully in water.

FIG. 3. Comparison of the mouldability of compositions comprising various amounts of resistant starch and soluble fibre.

We have developed a food material having a composition of about 40-80% insoluble resistant starch (RS), especially RS2 and RS3, derived from a natural source selected from the group comprising: grains, seeds, legumes, corn, rice, oat, barley, nuts, psyllium, tapioca, potatoes, beans, fruit and plantain.

The food material contains soluble fibre. The basis for establishing the soluble fibre quantity was undertaken by comparing brown and white or naturally occurring low GI and its refined high GI options, soluble fibre is present in an amount of about 1-20% by weight of the composition ideally the fibre is sourced from a natural source such as: chicory root, grains, seeds, corn, rice, oat, barley, nuts, psyllium, tapioca, beans, and fruit. The purpose of adding the soluble fibre, in addition to its nutritional function of slowing down GI and increasing fibre content, is also to increase the composite's ability to hold water enabling it to form a dough; as if using only insoluble resistant starch the material will not have any water binding properties and a dough, from which food particles can be fashioned, cannot be formed (FIG. 1).

The food material also contains a carbohydrate enzyme inhibitor(s) such as a starch enzyme inhibitor, ideally, an amylase inhibitor, sucrose inhibitor, maltase inhibitor, or glucosidase inhibitor, and for best results the enzyme inhibitor is present in an amount of about 0.1-10% by weight of the composition.

The composition was derived through lots of trial and error experimentation and some serendipity, to achieve a non-sticky dough which can be molded. Advantageously our food material is useful for lowering the glycemic index of a foodstuff.

As a non-sticky dough, we have extruded the composition into rice-like grains and added these extruded grains to normal jasmine rice, in doing so the GI of the rice/grains (measured by an in-vitro method) was incrementally reduced as the amount of our food material was added (FIG. 2).

GI of Thai Jasmine Rice–109 (high GI)
GI of Thai Jasmine Rice+4.5% extruded grains—60 (med GI)
GI of Thai Jasmine Rice+6.0% extruded grains—55 (low GI)

To further enhance the nature of the food material we have added a hydrocolloid and protein—these aid emulsification, binding and stabilise the food product. In the gut, hydrocolloid forms a viscous gel and hinders postprandial digestion. Although protein does not have an impact on glycemic impact per se, as it is not a carbohydrate, it slows down the rate of digestion of carbohydrates when eaten together. Hence, hydrocolloids and proteins also help to lower glycemic index.

In our food product we use protein present in an amount of about 0.1-10% by weight of the composition and, ideally, derived from natural sources such as: soy, wheat, pea, rice, and whey.

The hydrocolloid used in our product is present in an amount of about 0.1-10% by weight of the composition and, ideally, is derived from: xanthan gum, locust bean gum, agar, alginate, carrageenan, and guar gum.

An embodiment of our food product comprises: insoluble resistant starch in amount of about 70% by weight, soluble fibre in amount of about 15% by weight, enzyme Inhibitor in amount of about 0.5%, protein in amount of about 2% by weight and hydrocolloid in amount of about 0.5% by weight.

Another embodiment of our food product comprises: insoluble resistant starch in amount of about 50% by weight, soluble fibre in amount of about 10% by weight, enzyme Inhibitor in amount of about 1%, protein in amount of about 2% by weight and hydrocolloid in amount of about 0.5% by weight.

We typically use water to provide the remaining constituent.

Optionally, we also add supplements to the product such as at least one fortifying agent such as vitamins, minerals, fatty acids, lipids micronutrients, and co-enzymes.

It may also be advantageous to add at least one stabilizer.

The food product can be fashioned according to a user's requirement using conventional techniques, powder forms are favoured but so too are grains, noodles, ribbons, layers, chunks, shells, flakes, threads and granules.

Selected amounts of our food product can be added to a high GI food, before, during or after cooking, to lower the GI of same, the amount of our food product used is determined according to the desired GI for the combined products and is calculated using known techniques.

The invention claimed is:

1. A food material comprising:
insoluble resistant starch in an amount from 40-80% by weight of the food material;
soluble fibre in an amount from 10-20% by weight of the food material; and
at least one carbohydrate enzyme inhibitor in an amount from 0.5-2.5% by weight of the food material, and
water,
wherein the food material is in the form of dough, and
wherein the food material lowers the glycemic index of a foodstuff comprising the food material.

2. The food material according to claim 1, wherein said insoluble resistant starch is manufactured or derived from a natural source, optionally wherein said insoluble resistant starch is derived from a natural source selected from the group consisting of: grains, seeds, legumes, corn, rice, oat, barley, nuts, *psyllium*, tapioca, potatoes, beans, fruit and plantain.

3. The food material according to claim 1, wherein said insoluble resistant starch is a subtype selected from the group consisting of: RS1, RS2, RS3 and RS4.

4. The food material according to claim 1, wherein said soluble fibre is derived from a natural source selected from the group consisting of: chicory root, grains, seeds, corn, rice, oat, barley, nuts, *psyllium*, tapioca, beans, and fruit.

5. The food material according to claim 1, wherein said carbohydrate enzyme inhibitor is a starch enzyme inhibitor.

6. The food material according to claim 1, wherein said food material further comprises protein, and wherein said protein is present in an amount selected from the range 0.1-10% by weight of the food material.

7. The food material according to claim 4, wherein said protein is derived from natural sources selected from the group consisting of: soy, wheat, pea, rice, and whey.

8. The food material according to claim 1, wherein said food material further comprises at least one hydrocolloid, and wherein said hydrocolloid is present in an amount selected from the range 0.1-10% by weight of the food material.

9. The food material according to claim 8, wherein said hydrocolloid is selected from the group consisting of: xanthan gum, locust bean gum, agar, alginate, carrageenan, and guar gum.

10. The food material according to claim 8, wherein said insoluble resistant starch is present in amount of about 70% by weight, said soluble fibre is present in amount of about 15% by weight, said enzyme inhibitor is present in amount of about 0.5% by weight, and said hydrocolloid is present in amount of about 0.5% by weight, and wherein said food material further comprises protein in an amount of about 2% by weight.

11. The food material according to claim 8, wherein said insoluble resistant starch is present in amount of about 50% by weight, said soluble fibre is present in amount of about 10% by weight, said enzyme inhibitor is present in amount of about 1% by weight, and said hydrocolloid is present in amount of about 0.5% by weight, and wherein said food material further comprises protein in an amount of about 2% by weight.

12. The food material according to claim 1, wherein said food material further comprises at least one fortifying agent selected from the group consisting of: vitamins, minerals, fatty acids, lipids, micronutrients, and co-enzymes, optionally wherein said food material further comprises at least one stabilizer.

13. The food material according to claim 1, wherein said dough is formed into a food particle selected from the group consisting of: a grain, noodle, ribbon, layer, chunk, shell, flake, thread and granule.

14. A composite comprising the food material according to claim 1 and at least one foodstuff, wherein said foodstuff has a glycemic index, and wherein the glycemic index is lowered by the addition of said food material.

15. A food material according to claim 1, wherein said insoluble resistant starch is present in amount of about 50-80% by weight of the food material, said soluble fibre is present in amount of about 10-18% by weight of the food material, and said enzyme inhibitor is present in amount of about 0.5%-1.0% by weight of the food material.

* * * * *